United States Patent
Elomaa

(10) Patent No.: US 7,509,140 B2
(45) Date of Patent: Mar. 24, 2009

(54) APPARATUS AND METHOD FOR ACCEPTING INPUT IN NON-ACTIVE MODE

(75) Inventor: Timo Elomaa, Pirkala (FI)

(73) Assignee: Nokia Corporation, Espoo (FI)

( * ) Notice: Subject to any disclaimer, the term of this patent is extended or adjusted under 35 U.S.C. 154(b) by 300 days.

(21) Appl. No.: 11/102,633

(22) Filed: Apr. 11, 2005

(65) Prior Publication Data

US 2005/0181821 A1   Aug. 18, 2005

Related U.S. Application Data

(63) Continuation of application No. 09/867,619, filed on May 31, 2001, now Pat. No. 6,892,081.

(51) Int. Cl.
*H04M 1/00* (2006.01)

(52) U.S. Cl. ............... 455/550.1; 455/90.1; 455/575.1; 370/433.06; 370/433.07

(58) Field of Classification Search ............. 455/550.1, 455/575.1, 90.1, 95, 186.1, 186.2; 379/433.01, 379/433.06, 433.07
See application file for complete search history.

(56) References Cited

U.S. PATENT DOCUMENTS

| | | | |
|---|---|---|---|
| 4,982,424 A | 1/1991 | Saito et al. | |
| 5,241,583 A | 8/1993 | Martensson | |
| 5,247,565 A * | 9/1993 | Joglekar et al. | ............. 455/564 |
| 5,737,394 A | 4/1998 | Anderson et al. | |
| 6,198,948 B1 | 3/2001 | Sudo et al. | |
| 6,208,876 B1 | 3/2001 | Raussi et al. | |
| 6,332,024 B1 | 12/2001 | Inoue et al. | |
| 6,370,362 B1 | 4/2002 | Hansen et al. | |
| 6,405,060 B1 | 6/2002 | Schroeder et al. | |
| 6,449,496 B1 | 9/2002 | Beith et al. | |
| 6,463,304 B2 | 10/2002 | Smethers | |
| 6,571,086 B1 | 5/2003 | Uusimäki | |
| 6,670,884 B1 * | 12/2003 | Tett | ............. 340/7.1 |
| 6,678,534 B2 | 1/2004 | Ishigaki | |
| 2002/0078393 A1 * | 6/2002 | Parker | ............. 713/324 |

FOREIGN PATENT DOCUMENTS

| | | |
|---|---|---|
| EP | 0 913 977 A2 | 5/1999 |
| WO | WO/9937077 | 7/1999 |
| WO | WO/0046969 | 8/2000 |

* cited by examiner

*Primary Examiner*—CongVan Tran
(74) *Attorney, Agent, or Firm*—Banner & Witcoff, Ltd.

(57) ABSTRACT

The present invention is a method and mobile terminal which permits at least one mobile terminal function to be activated and selected using at least one soft key during an inactive and locked mode of a mobile terminal keypad. A mobile terminal in accordance with the invention includes a controller (18); a keypad (2) comprising a plurality of keys (7, 8a, 8b, 10), including at least one soft key coupled to the controller, the keypad being under control of the controller and having an active mode during which key inputs from the keys activate mobile terminal functions and the inactive mode during which a first type of key input from the at least one soft key to the controller does not activate the mobile terminal functions; and wherein during the inactive mode, the controller is responsive to a second type of key input from at least one soft key which activates at least one mobile terminal function without return to the active mode.

26 Claims, 2 Drawing Sheets

APPARATUS AND METHOD FOR ACCEPTING INPUT IN NON-ACTIVE MODE

This application is a continuation of U.S. application Ser. No. 09/867,619 filed on May 31, 2001 now U.S. Pat. No. 6,892,081 the contents of which are hereby incorporated herein by reference in their entirety. The present invention relates to mobile terminals and methods of operation in which mobile terminal functions are initiated by soft keys during an inactive mode of a keyboard thereof.

BACKGROUND OF THE INVENTION

Field of the Invention

Description of the Prior Art

FIG. 1 shows prior art mobile terminal 1 of the Assignee used for cellular telecommunications which communicates via a wireless telecommunication network, e.g. a cellular network. However, the mobile terminal 1 could be used in a cordless network.

The keypad 2 has a first group of twelve keys 7. e.g. alphanumeric keys, by means of which the user can enter a telephone number, write a test message (SMS), write a name (associated with the phone number), etc. Each of the twelve alphanumeric keys 7 is provided with identifying numerals "0-9" or a sign "#" or "*" respectively. In alpha mode, each key is associated with a number of letters and special signs are used in text editing.

The keypad 2 additionally comprises a second group of keys which are two soft keys 8, two call handling keys 9, and a navigation key 10. The two soft keys 8 operate in conjunction with the liquid crystal display 3 to display text which varies dependent upon the mode of operation and provides the user with the ability to select different programmed modes of operation provided by programming resident in the memory 17. Soft keys are not limited to the selection of a single dedicated terminal function. The illustrated soft keys 8 may have a functionality corresponding to the Assignee's models 2110™ and 8110™. At least one of the soft keys is defined as an operation key 8a having multiple functionality for handling access to a menu structure. The functionality of the operation key 8a depends on the present state of the phone. The operation key 8a is arranged to perform a group of predetermined actions associated with a state. The default function or the present function of the operation key 8a can be displayed in a predetermined area 21 of the display 3, as illustrated in FIGS. 3 and 5(a) and 5(b), just above the key 8a.

The scroll key 10, which can also be called a navigation key, is an up/down key and is placed centrally on the front surface of the phone between the display 3 and the group of alphanumeric keys 7. The user controls the scroll key 10 by simply pressing the up/down key using his/her thumb which allows the user to scroll between a group of items in a menu provided in the user interface. Since many experienced phone users are used to one-hand control, it is a very good solution to place an input key, requiring precise motor movements. Thus, the user may place the phone in the hand between the finger tips and the palm of the hand. The thumb is thereby free for inputting information. The scroll key 10 can be a roller key (not shown), which is arranged to rotate in one or several directions. The roller key allows the user to roll the key to scroll between different items in a menu. The roller key 10 may be in accordance with the Assignee's U.S. patent application Ser. No. 08/923,696 which is incorporated herein by reference in its entirety.

Further, the scroll key 10 allows the user to scroll selectively between a group of items in a menu. This means that the user can select an item preceding or succeeding the item in the menu loop of the phone, while he/she can access a sub-menu loop under the item concerned in the menu loop by activation of the operation key 8a.

In some states, such as entering a phone number on the alphanumeric keypad 7, the other soft key 8b can be defined as a clear key, which may be used for erasing the last entered digit or letter by brief depression on the clear key 8b. If the clear key 8b is depressed for a longer duration, the entire number or word is erased.

Although the functions of the mobile terminal 10 may be controlled by the operational key 8a, it sometimes can be expedient to use two or more operational soft keys in the second group of keys, which can be integrated into a touch-sensitive display (not shown) in a manner analogous to a screen of a personal digital assistant (PDA).

The two call handling keys 9 are used for establishing a call or a conference call, terminating a call or rejecting an incoming call.

FIG. 2 schematically shows a block diagram of major parts of the mobile terminal 1 of FIG. 1. These parts are conventional and are typically used in mobile terminals such as those in which the present invention may be practiced. The microphone 6 records the users speech, and analog signals formed thereby are A/D converted in an A/D converter (not shown) before the speech is encoded in an audio part 14. The encoded speech signal is transferred to a controller which is a programmed microprocessor 18 that executes programming to control the mobile terminal 1 of FIG. 1. The processor 18 may execute diverse types of software to provide a wide variety of terminal functions during an active mode which are well known. The processor 18 also forms the interface to peripheral units, comprising a LCD driver 13 which drives the LCD display 3 of FIG. 1 to provide graphical displays to the user, RAM memory 17a and a Flash ROM memory 17b, a SIM card 16, and the keyboard 2 in the form, for example without limitation, of a keypad (as well as data, power supply, etc.). The processor 18 communicates with a transmitter/receiver 19, which sends/receives a request/response to/from one or several telecommunication networks. The audio part 14 speech-decodes the signal, which is transferred from the processor 18 to the speaker 5, via a D/A converter (not shown).

The processor 18 is connected to the user interface. The processor 18 monitors the activity in the mobile terminal 1 and controls the display 3 through display driver 13. The plurality of states which may be assumed by the mobile terminal 1 are displayed on display 3. The processor 18 detects the occurrence of a state changing event, and changes the state of mobile terminal 1. State changing events affect the functionality of the operation key 8a, and redefine it, in response to the preceding state and the nature of the detected state change event. Thus, a state change may also cause a change of the displayed text. A state changing event may be caused by the user when pressing the keypad, as shown in FIG. 1. This type of state changing events are called entry events or user events. Also, the network communicating with the phone may cause a state changing event. This type of event and other events beyond the user's control are called non user events. Non user events comprise status change during call set-up, change in battery voltage, change in antenna conditions, message on reception of SMS. etc.

In FIG. 3 a single display example is illustrated of the many mobile possible terminal functions which may be selected during the active mode of the keyboard by key inputs. The user interface can act in idle mode 30 when the keypad is active (not locked) to select diverse mobile terminal functions. The user interface comprises the elements shown in FIG. 1. The microprocessor 18 of FIG. 2 controls the user interface. Initially, a layout 30 is displayed by a mobile terminal 1 as shown in FIGS. 1 and 2, which indicates signal strength 35 from the wireless telecommunication network "D1 Telekom" 40, the battery power 45 and a clock showing the time 50 in hours and minutes. The display is on the LCD display 3. The layout 30 presents an example of the mobile terminal in idle mode 30, i.e. a state in the active mode of the keyboard 2 when the phone is activated and is awaiting an action, by pressing an alphanumeric key, receiving an incoming call or establishing an outgoing call. In the bottom of the display 3 there are two items which are denoted as "Menu" 55 and "Names" 60 under the control of two soft keys 8a and 8b shown in FIG. 1. If the user selects "Names" 60, access to a built-in phone book is achieved. If the user selects "Menu" 55, selection from different menus of selectable terminal functions may be made.

Additional functions may be performed by the user interface as described in the Assignee's U.S. patent application Ser. No. 09/506,582, filed Feb. 8, 2000, entitled "A Radiophone Provided with an Operation Key with Multiple Functionality for Handling Access to a Menu Structure" which application is incorporated herein by reference in its entirety.

The mobile terminal of FIG. 1 also has an inactive mode when the mobile terminal 1 is idle and the keypad or keyboard 3 is locked. The locking of the keypad or keyboard 3 may be accomplished by the entry of a numerical input, such as a four digit number from the keypad or keyboard 3 which prevents any mobile terminal functions from being selected by any key input including the soft keys 8, such as the placing or receiving of calls or more complicated functions, such as that described above with reference to FIG. 3. The locking of the keyboard 3 or keypad is effective to prevent accidental or unauthorized terminal functions from being activated during the idle mode when the keyboard 3 or keypad is locked and intended by the user to be inactive. Locking of keyboards or keypads is widely used in mobile terminals which do not provide keyboard covers.

FIG. 4 illustrates a display by the LCD 3 during the locked state of the keypad or keyboard 3. The displayed "locked" icon 100 visually informs the user of the idle state of the mobile terminal 1 and the locked and inactive mode of the keypad or keyboard 3. During the locked inactive mode of the keypad or keyboard 3, single key inputs to the processor 18 do not activate mobile terminal functions.

To release the "locked" state, the user of the phone inputs a command to the mobile terminal through the keypad or keyboard 3 which returns the keypad or keyboard to the active state during which normal mobile terminal functions may be selected. The command may be by the inputting from the keys of a two digit number.

Voice activated calling, which is instituted by a voice command of the user inputted to the processor 18 by the microphone 6, is currently limited to situations when the keypad or keyboard 3 is in the active mode. In this situation, the user of the mobile terminal 1 may have to take the mobile terminal 1 out of a pocket, purse or briefcase and activate the keypad or keyboard which, as stated above, typically takes two keypresses, a probable checking of the LCD display 3 to insure correctness of the action and with a long press on the menu key 55 to activate the voice caller. This degree of user action has the effect on the user, because of the required time and concentration, to make selection of voice activated calling obsolete in that it is just as easy for the user to activate the keyboard and place the call with the speed dialing feature from the keypad or keyboard 3 or browse the phone book which may be accessed by the names 60. Moreover, in situations where checking mobile terminal status is difficult, like when driving or walking, usage of the mobile terminal 1 would be enhanced if voice activated calling could be initiated by a single key press while the mobile terminal is in the idle state and the keypad or keyboard 3 is locked.

Some phones have used a dedicated key to initiate voice activated calling. This mode of calling is initiated while the phone keypad is active. Furthermore, the use of a dedicated key adds expense and complexity especially to state of the art phones which are very small.

Mobile phones are in use which use a single soft key input followed by a hard key input (e.g. #1) which locks the keypad from initiating mobile terminal functions. Thereafter, the user is only permitted, while the keypad is locked, to answer call by pressing any key including hard or soft keys.

SUMMARY OF THE INVENTION

The present invention is a mobile terminal and method of operation thereof in which a keypad comprising at least one soft key of the mobile terminal during an inactive mode is used to activate at least one mobile terminal function without entry of a command to return the keypad to an active mode. As used herein, a mobile terminal function is exclusive of the answering of an incoming call. Moreover, in a preferred embodiment of the invention, the completion and/or initiation of at least one mobile terminal function is in response to an input from at least one soft key and to a sensed environmental state such as, but without limitation, sound sensed by a microphone or signals which may be received by receiver circuitry of the-mobile-terminal. During the normal idle mode of the mobile terminal when the keypad is locked in an inactive mode, a first type of key input from the soft keys to the controller does not activate mobile terminal functions, but a second type of keypad input from at least one of the soft keys activates at least one mobile terminal function thereby permitting the user to have selective access to terminal functions requiring a minimum of user interaction with the user interface. The second type of key input may be of any type which differentiates between the first type which are random key inputs which occur when the keypad is locked that are not intended for any purpose and further is not the key input used for returning the keypad to the active status. The second type may be considered as being coded to differentiate between random inputs as described above which have no effect on changing the state of the keypad. Without limitation, the mobile terminal functions which may be selected during the inactive mode of the keypad by a second type of soft keypad input may be any one of voice activated functions, such as without limitation, calling and mobile terminal functions selected in response to the ambient sound level of the mobile terminal during the inactive mode, including switching the mobile terminal to inaudible ringing or to a louder ringing. Furthermore, the mobile terminal may include a sensor which is coupled to the controller which senses a reception of a beacon such as without limitation a transmission using a selected telecommunications protocol and further, in response to the reception, the controller enables the mobile terminal during the inactive mode with the soft keys to activate at least one mobile terminal function, such as, without limitation, changing ringing mode in response to the sensing of a Bluetooth signal or turning off the mobile terminal in specific locations where mobile terminal operation is not permitted or desired, such as in hospitals or airplanes, or the initiation of temporary terminal functions utilizing the mobile terminal, in response to detection of a local Bluetooth wireless application protocol (WAP) server, to signal the wireless network to cause diverting calls to a user's land line.

The present invention is a mobile terminal comprising a controller, a keypad comprising a plurality of keys including at least one soft key coupled to the controller with the keypad being under control of the controller and having an active mode during which key inputs from the keys activate mobile terminal functions and an inactive mode during which a first type of key input from at least one soft key to the controller does not activate the mobile terminal functions; and wherein during the inactive mode, the controller is responsive to a second type of key input from at least one soft key which activates at least one mobile terminal function without return to the active mode. The second type of key input may be an input from one soft key which may be a single soft keystroke having a duration which is longer than a selected time interval or a double soft keystroke from one of the soft keys with each soft keystroke having a duration less than a set time interval. A display, under control of the controller, may display an indicator of the inactive mode; and wherein the activation of the at least one mobile terminal may be to initiate selection of a mobile terminal function during the inactive mode by the second type of key input which may be signalled by display of an indicator of the inactive mode and display of another indicator. The another indicator may be an icon or text. A microphone may be coupled to the controller; and the at least one mobile terminal function activated during the inactive mode may be a voice activated function which may be inputted by a voice input through the microphone from a user of the mobile terminal to the controller which controls outputting of the voice activated function. The controller may, in response to a sound level sensed by the microphone, enable at least one mobile terminal function during the inactive mode. The at least one mobile terminal function activated during the inactive mode may be switching the mobile terminal to an inaudible ringing or to louder ringing. A sensor, may be coupled to the controller which senses reception of transmissions; and the controller, in response to the reception, may enable a mobile terminal function during the inactive mode to activate at least one mobile terminal function.

A method of activating a terminal function using a mobile terminal having a controller and keypad comprising a plurality of keys including at least one soft key coupled to the controller with the keypad under control of the controller having an active mode during which key inputs from the keys activate terminal functions and an inactive mode during which a first type of key input from at least one soft key to the controller does not activate mobile terminal functions in accordance with the invention comprises inputting a second type of key input from at least one soft key to the controller during the inactive mode which activates at least one mobile terminal function without return to the active mode. The second type of key input may be an input from one soft key which may be a single keystroke having a duration which is longer than a selected time interval or a double soft keystroke from one of the keys with each keystroke having a duration less than a set time interval. A display, under control of the controller, may display an indicator of the inactive mode; and wherein the activation of the at least one mobile terminal to initiate selection of a mobile terminal function during the inactive mode by the second type of key input may be signalled by display of an indicator of the inactive mode and another indicator. The another indicator may be an icon or text. The mobile terminal may comprise a microphone coupled to the controller; and the at least one mobile terminal function may be voice activated function which is inputted by a voice input through the microphone from a user of the mobile terminal to the controller which controls outputting of the voice activated function. The controller may, in response to a sound level sensed by the microphone, enable at least one mobile terminal function during the inactive mode. The at least one mobile terminal function activated during the inactive mode may be switching the mobile terminal to an inaudible or louder ringing. A sensor, may be coupled to the controller, which senses reception of transmissions; and the controller, in response to the reception, may enable a mobile terminal function during the inactive mode to activate at least one mobile terminal function.

A mobile terminal in accordance with the invention includes a controller, at least one sensor which is responsive to an environmental input from an environment in which the mobile terminal is located; a keypad comprising a plurality of keys, including at least one soft key coupled to the controller, the keypad being under control of the controller and having an active mode during which key inputs from the keys activate mobile terminal functions and an inactive mode during which a first type of key input from the at least one soft key to the controller does not activate the mobile terminal functions; and wherein during the inactive mode, the controller is responsive to an input fro the at least one sensor and a second type of key input from at least one soft key which activates at least one mobile terminal function without return to the active mode. The second type of key input may be an input from one soft key which may be a single keystroke having a duration which is longer than a selected time interval or a double keystroke from one of the keys with each keystroke having a duration less than a set time interval. A display, under control of the controller, may display an indicator of the inactive mode; and wherein the activation of the at least one mobile terminal to initiate selection of a mobile terminal function during the inactive mode by the second type of key input may be signalled by display of an indicator of the inactive mode and display of another indicator. The another indicator may be an icon or text. The sensor may be a microphone and the input from the environment is sound and the activated at least one mobile terminal function may be the placing of a voice activated function originating from the mobile terminal or may be changing of a ringing tone for communications being received by the mobile terminal. The sensor may be receiving electronics and the input from the environment may be detection of telecommunications being broadcast and the activated at least one mobile terminal function may be turning off the mobile terminal or is diverting communications from being broadcast to the mobile terminal to being received by another device. The environmental input may be location information of the mobile terminal and the mobile terminal function which is activated, selected or completed may be dependent upon the location information provided to the mobile terminal.

A method of activating a terminal function using a mobile terminal having a controller, at least one sensor which is responsive to an environmental input from an environment in which the mobile terminal is located and keypad comprising a plurality of keys, including at least one soft key coupled to the controller, the keypad under control of the controller having an active mode during which key inputs from the keys activate terminal functions and an inactive mode during which a first type of key input from the at least one soft key to the controller does not activate mobile terminal functions in accordance with the invention includes receiving an input from the at least one sensor and inputting a second type of key input from at least one soft key to the controller during the inactive mode which activates at least one mobile terminal function without return to the active mode. The second type of key input may be an input from one soft key which may be a single keystroke having a duration which is longer than a selected time interval or a double keystroke having a duration less than a set time interval. A display, under control of the controller, may display an indicator of the inactive mode; and wherein the activation of the at least one mobile terminal to initiate selection of a mobile terminal function during the inactive mode by the second type of key input may be signalled by display of an indicator of the inactive mode and another indicator. The another indicator may be an icon or text. The sensor may be a microphone and the input from the environment is sound and the activated at least one mobile terminal function may be the placing of a voice activated function originating from the mobile terminal or is changing of a ringing tone for communications being received by the mobile terminal. The sensor may be receiving electronics and the input from the environment may be detection of telecommunications being broadcast and the activated at least one mobile terminal function may be turning off the mobile terminal or diverting communications from being broadcast to the mobile terminal to being received by another device. The environmental input may be location information of the mobile terminal and the mobile terminal function which is activated, selected or completed may be dependent upon the location information provided to the mobile terminal.

BRIEF DESCRIPTION OF THE DRAWINGS

Like reference numerals identify like parts throughout the drawings.

DESCRIPTION OF THE PREFERRED EMBODIMENTS

The present invention permits activation of at least one mobile terminal function with at least one soft key during the inactive mode of a keypad by the inputting of a second type of programmed and/or coded input from at least one soft key different from a random or unintentional first type of soft key input which does not change the keypad to the active mode. The present invention may be practiced in any form of mobile terminal, such as, but without limitation, the prior art mobile terminal 1 discussed above in association with FIGS. 1-4. As used herein a mobile terminal includes, but is not limited to, any telecommunications device which has a lockable keypad such as telephones and telephones integrated with computer functions such as a PDA. The second type of key input from a keypad may be, without limitation, a single keystroke from a soft key having a duration which is longer than a selected time interval to thus differentiate between accidental and/or random inputs or unauthorized inputs from the soft keys which have no effect on the intended locked inactive mode of the keypad. Alternatively, coded inputs from at least one soft key, may be inputted to signal the controller of the mobile terminal (e.g. processor 18) that the user wishes to activate a mobile terminal function without having to switch the mobile terminal out of the inactive mode by a keypad input to an active mode to then input selection of mobile terminal functions by additional key inputs in accordance with the prior art. The changing of the keypad from the inactive mode to the active mode with the present invention is not an activation, selection or completion of a mobile terminal function. The activation, selection, or completion of a mobile terminal function requires an additional user action beyond unlocking of the keypad which also does not constitute answering of a communication to the mobile terminal. For example, any coded input of at least one soft keystroke such as, without limitation, two or more short duration soft key inputs which each are less than a predetermined time interval may be inputted to signal the controller that the user wishes to select a mobile terminal function directly without switching from inactive locked mode of the keypad to the active unlocked mode and thereafter inputting additional key inputs to select mobile terminal functions.

Figure 5A:
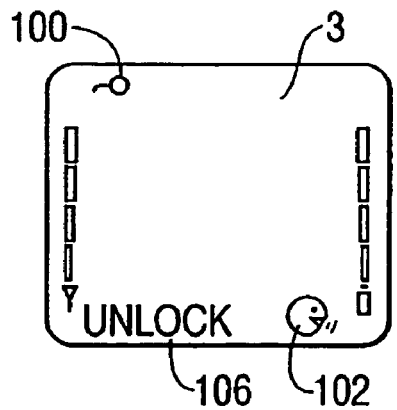
FIGS. 5(a) and 5(b) respectively illustrate displays of a mobile terminal in accordance with the present invention when a second type of keypad input activates a voice activated calling function during an inactive mode of the keypad.
Figure 5B:
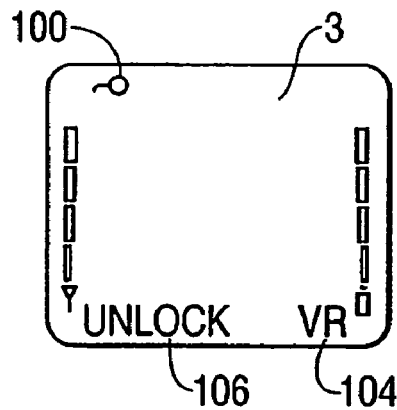

FIGS. 5(a) and 5(b) illustrate alternative forms of display which may be, without limitation, presented to the user to visually inform the user of the state of the keyboard in the inactive mode while at least one mobile terminal function has been or may be activated. The locked indicator icon 100 is displayed as in the prior art to indicate the locking of the keypad in the inactive mode. Additionally, either an icon 102 or a text display 104 is displayed which signals the user that a terminal function has been or may be activated. In FIGS. 5(a) and 5(b) the icon 102 and text display 104, such as, without limitation, the letters "VR" indicate that a voice activated function, such as voice commands, voice activated calls, etc. has been selected. Furthermore, text 106 "unlock" is displayed to indicate the change in status of the keypad to visually signal the user that activation of a terminal function is permitted even though the lock indicator 100 is continually displayed.

The use of the soft keys to select, activate, or complete mobile terminal functions directly while the keypad is locked may be associated with sensed inputs. The microphone 6 and receiver circuitry 19 may sense environmental conditions, such as without limitation sound, or receive signals, such as broadcast of telecommunications, which cause the mobile terminal 1 to dynamically activate, select or complete a mobile function.

While FIGS. 5(a) and 5(b) illustrate the display of either an icon or text to indicate the activation of voice activated calling, it should be understood that in accordance with the invention other terminal functions may be activated in the same manner. These functions, like voice activated functions, are activated by minimal user intervention with the user interface in view of it not being necessary to unlock the keypad followed by additional keypad input of the selected terminal function as in the prior art. Again, with respect to these additional selectable terminal functions, any form of keypad input from a soft key may be utilized. Without limitation, additional functions which may be activated while the keyboard is locked and in the inactive mode may be controlled by sound inputs from a microphone, such as microphone 6 in FIGS. 1 and 2 to activate or initiate mobile terminal functions. For example, the ambient sound level could be detected by microphone 6 during the inactive mode of the keypad which would cause the display of text or an icon signalling that the ringing mode of the mobile terminal has changed to either inaudible in response to low background noise or increased loudness in response to high background noise. Such a change could occur automatically or after text or an icon has been displayed after inputting of one or more keystrokes of the second type.

Figure 1:
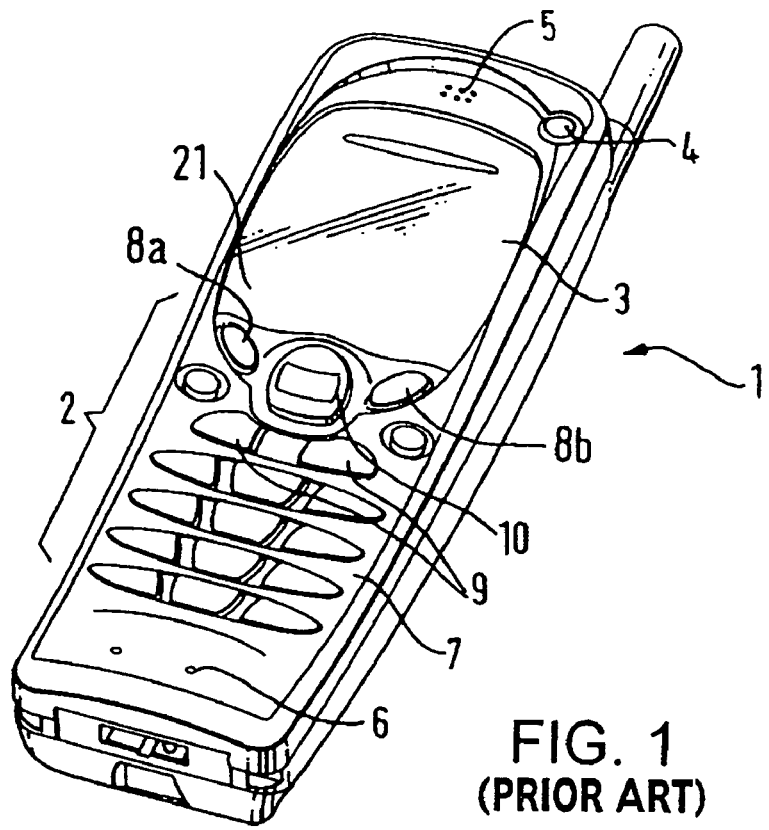
FIG. 1 illustrates a prior art mobile terminal of the type manufactured by the Assignee of the present invention.
Figure 2:
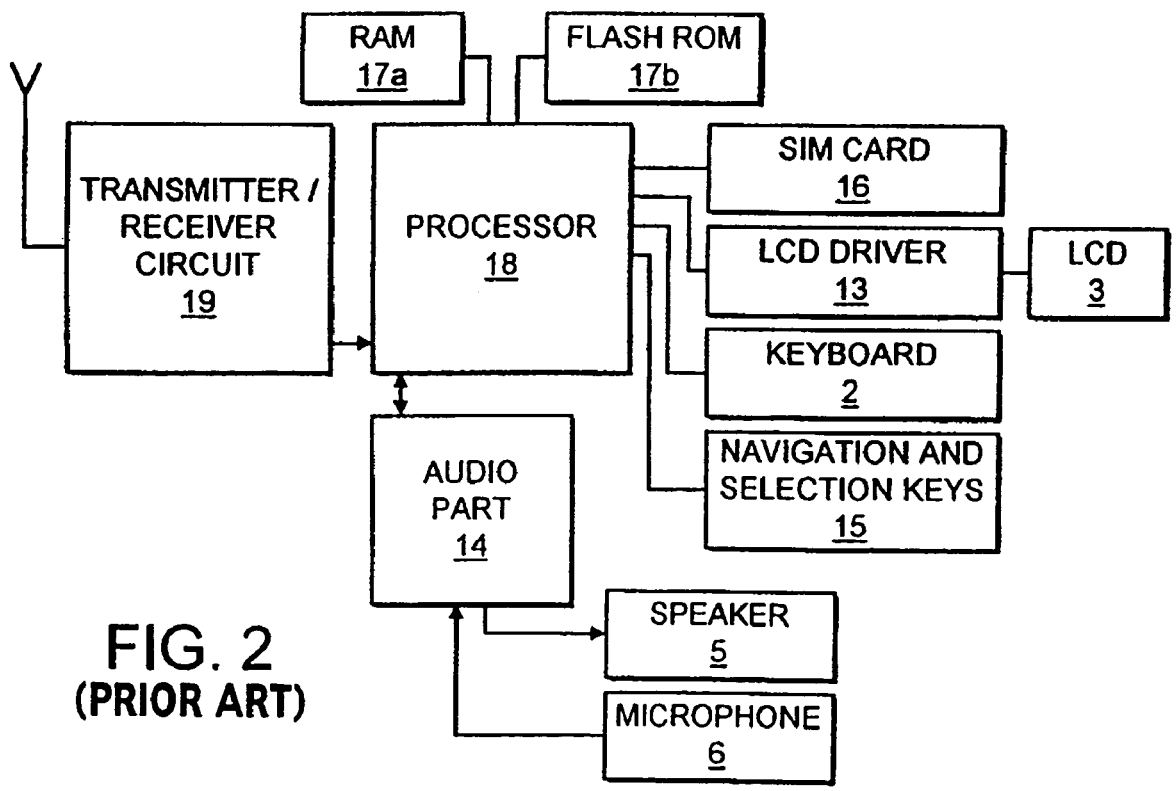
FIG. 2 illustrates a block diagram of the prior art electronics of the mobile terminal of FIG. 1.
Figure 3:
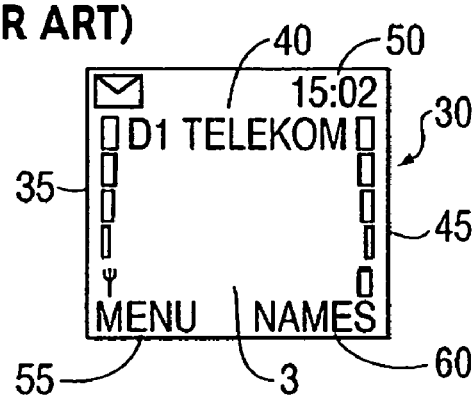
FIG. 3 illustrates a prior art example of the display of an interface function in accordance with the prior art in the idle mode when the keypad is not locked.
Figure 4:
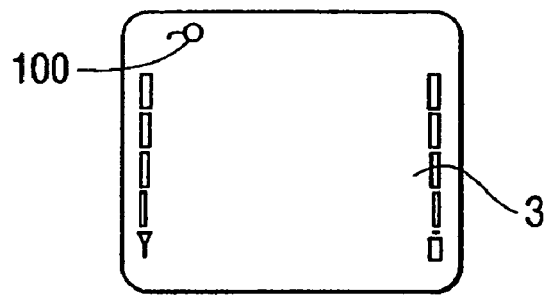
FIG. 4 illustrates a prior art display of the LCD 3 when the keypad is locked preventing the activation of mobile terminal functions when in the inactive mode.

Additionally, the transmitter/receiver circuitry 19 of FIG. 2 may include sensors, detection capability, or circuitry which detects a radio transmission using a selected telecommunications protocol or otherwise detects signals or transmissions that the mobile terminal is at a location at which a different mobile terminal function is to be presented to the user for selection or completed during the inactive mode. The processor 18 activates, selects, or causes completion of a mobile terminal function which is dependent on the input from the sensors, detection capability, or circuitry. Such detection could be a reception of Bluetooth transmissions or communications from a Bluetooth WAP server which causes the generation of either text or an icon on the display 3 informing the user that a possible activation or selection of a different terminal function is presented to the user or completion thereof occurs during the inactive mode without requiring entry into the active mode as in the prior art. Additionally, automatic turn off of the mobile terminal, such as required in hospitals or airplanes, may be detected by the transmitter/receiver circuitry 19 sensing a signal, such as that from a specified telecommunications protocol which initiates a display on display 3 signalling the user, it is desirable to power down the mobile terminal or for power down to occur automatically.

Additionally, the transmitter/receiver circuitry 19 of FIG. 2 may include a sensor or location detection capability or circuitry for providing location information of the mobile terminal or the location information could also be provided from a communication network (not illustrated) which is linked to the mobile terminal 1. The location information from the communication network may be, without limitation, enhanced observed time difference (E-OTD) or IP-DL. IP-DL is described in 3G Standard 25.214 in Sections 8 and 8.1 which are incorporated herein by reference in their entirety. An internal location device providing location information in the transmitter/receiver circuitry 19 of FIG. 2 may be, without limitation, GPS. The mobile terminal function which is activated, selected or completed is responsive to the location information input and is dependent thereon so that the particular mobile terminal function is determined from the location information.

The present invention provides voice activated functions, such as calling, at reduced cost and complexity compared to the prior art requiring additional keys, such as dedicated keys, to be added in phones of reduced size. The invention avoids the addition of keys beyond the conventional soft keys to initiate mobile terminal functions which additions are expensive and present spatial problems. With the invention, at least one soft key is used to provide the user with a selection of at least one mobile terminal function with a minimal amount of user interaction with the user interface directly from the inactive mode of the keypad without requiring exiting thereof as in the prior art.

After completion of the mobile terminal function, the mobile terminal may by default return to the inactive mode of the keypad or automatically transition to the active mode or present the user with a choice.

While the invention has been described in terms of its preferred embodiments, it should be understood that numerous modifications may be made thereto without departing from the spirit and scope of the invention. It is intended that all such modifications falls within the scope of the appended claims.

The invention claimed is:

1. A computer-readable medium having computer-executable instructions for performing a method comprising:
    sensing a user's selection on an input device during an inactive mode, the inactive mode being when a first type of input from the input device does not activate terminal functions;
    in response to sensing a user's selection, accepting a second type of input from the input device during the inactive mode, the second type of input corresponding to the user's selection; and
    in response to accepting a second type of input, activating a terminal function without returning the input device to an active mode, the active mode being when inputs from the input device activate terminal functions.

2. The computer-readable medium of claim 1, wherein the step of sensing the user's selection comprises sensing user selection of a key.

3. The computer-readable medium of claim 2, wherein the step of sensing the user's selection comprises sensing a double selection of the key within a set time interval.

4. The computer-readable medium of claim 2, wherein the step of sensing the user's selection comprises sensing a single selection of the key for a period longer than a selected time interval.

5. The computer-readable medium of claim 2, wherein, the steps of sensing and accepting include sensing and accepting input from, a touch-sensitive display into which the key is integrated.

6. The computer-readable medium of claim 1, wherein the steps of sensing and accepting the user's selection comprises sensing a key press of a key of a keypad.

7. The computer-readable medium of claim 6, wherein the key comprises a soft key.

8. The computer-readable medium of claim 1, the steps further comprising:
    sensing an environmental input received by a sensor coupled to a controller; and enabling the terminal function in response to the step of sensing the environmental input.

9. The computer-readable medium of claim 8, wherein the environmental input is selected from the group consisting of a sound, a voice, a telecommunications broadcast and reception of location information.

10. The computer-readable medium of claim 1, wherein the method is performed by a mobile terminal.

11. An apparatus comprising:
    an input device coupled to a controller, the input device having an active mode during which inputs from the input device activate terminal functions and an inactive mode during which a first type of input from the input device does not activate terminal functions; and
    a memory storing computer-executable instructions for performing a method comprising:
    sensing a user's selection on the input device during the inactive mode;
    in response to the sensing, accepting a second type of input from the input device during the inactive mode, the second type of input corresponding to the user's selection; and
    in response to the accepting, activating a terminal function without returning the input device to the active mode.

12. The apparatus of claim 11, further comprising a sensor sensing reception of an environmental input.

13. The apparatus of claim 12, wherein the environmental input is selected from the group consisting of a sound, a voice, a telecommunications broadcast and reception of location information.

14. The apparatus of claim 12, wherein the sensor is selected from the group consisting of a microphone, a global positioning system receiver, and a receiver.

15. The apparatus of claim 11, wherein the input device comprises a key and the user's selection comprises selection of the key.

16. The apparatus of claim 15, wherein the user's selection comprises a double selection of the key within a set time interval.

17. The apparatus of claim 15, wherein the user's selection comprises a single selection of the key that is longer than a selected time interval.

18. The apparatus of claim 15, wherein the input device comprises a touch-sensitive display into which the key is integrated.

19. The apparatus of claim 11, wherein the input device comprises a keypad and the user's selection comprises a key press of a key of the keypad.

20. The apparatus of claim 11, wherein the input device comprises a soft key.

21. The apparatus of claim 11, wherein the apparatus is a mobile terminal.

22. A method comprising:
sensing a user's selection on an input device during an inactive mode, the inactive mode being when a first type of input from the input device does not activate terminal functions;
in response to sensing a user's selection, accepting a second type of input from the input device during the inactive mode, the second type of input corresponding to the user's selection; and
in response to accepting a second type of input, activating a terminal function without returning the input device to an active mode, the active mode being when inputs from the input device activate terminal functions.

23. The method of claim 22, wherein the step of sensing the user's selection comprises sensing user selection of a key.

24. The method of claim 23, wherein, for the steps of sensing and accepting include sensing and accepting input from a touch-sensitive display into which the key is integrated.

25. The method of claim 22, wherein the step of sensing the user's selection comprises sensing a key press of a key of a keypad.

26. The method of claim 22, wherein the method is performed by a mobile terminal.

* * * * *